(12) United States Patent
Jiang

(10) Patent No.: US 11,979,643 B2
(45) Date of Patent: May 7, 2024

(54) VIDEO PUSHING METHOD AND APPARATUS BASED ON VIDEO SEARCH, AND ELECTRONIC DEVICE

(71) Applicant: BEIJING BYTEDANCE NETWORK TECHNOLOGY CO., LTD., Beijing (CN)

(72) Inventor: Chun Jiang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/761,848

(22) PCT Filed: Aug. 3, 2020

(86) PCT No.: PCT/CN2020/106584
§ 371 (c)(1),
(2) Date: Mar. 18, 2022

(87) PCT Pub. No.: WO2021/052041
PCT Pub. Date: Mar. 25, 2021

(65) Prior Publication Data
US 2022/0279253 A1    Sep. 1, 2022

(30) Foreign Application Priority Data
Sep. 20, 2019 (CN) .......................... 201910894059.2

(51) Int. Cl.
*H04N 21/482* (2011.01)
*H04N 21/437* (2011.01)
*H04N 21/472* (2011.01)

(52) U.S. Cl.
CPC ....... *H04N 21/4828* (2013.01); *H04N 21/437* (2013.01); *H04N 21/472* (2013.01)

(58) Field of Classification Search
CPC ............... H04N 21/437; H04N 21/472; H04N 21/4826; H04N 21/4828; H04N 21/8549
See application file for complete search history.

(56) References Cited

U.S. PATENT DOCUMENTS

2008/0270449 A1* 10/2008 Gossweiler ........ H04N 21/8586
707/999.102
2011/0164175 A1* 7/2011 Chung ............. H04N 21/42209
348/468

(Continued)

FOREIGN PATENT DOCUMENTS

CN    101689183 A    3/2010
CN    106131690 A    11/2016

(Continued)

OTHER PUBLICATIONS

Rejection Decision dated Aug. 25, 2022 in Chinese Patent Application No. 201910894059.2 (6 pages) with an English translation (9 pages).

(Continued)

Primary Examiner — Rong Le

(57) ABSTRACT

Provided are a video pushing method and apparatus, and an electronic device. The method includes: transmitting a received search keyword to a server; receiving first video preview information, fed back by the server, of at least two first videos matching the search keyword and including at least two types of videos, and displaying the first video preview information on a first display interface; in response to receiving a play-triggering operation on first target preview information in the first video preview information, transmitting, to the server, a video-obtaining request carrying identification information of a first target video corresponding to the first target preview information; and receiving at least two second videos and corresponding second video preview information that are fed back by the server (Continued)

based on the video-obtaining request, and displaying a first predetermined number of pieces of preview information in the second video preview information on a second display interface.

4 Claims, 7 Drawing Sheets

(56) References Cited

U.S. PATENT DOCUMENTS

| | | | | |
|---|---|---|---|---|
| 2014/0045484 | A1* | 2/2014 | Kim | H04N 21/4122 455/420 |
| 2015/0186525 | A1 | 7/2015 | Noguerol | |
| 2016/0125079 | A1* | 5/2016 | Wiegering | G06F 40/134 707/769 |
| 2017/0324989 | A1 | 11/2017 | Tsuruga et al. | |
| 2020/0084515 | A1* | 3/2020 | Chai | H04N 21/4312 |

FOREIGN PATENT DOCUMENTS

| | | |
|---|---|---|
| CN | 106231428 A | 12/2016 |
| CN | 107105349 A | 8/2017 |
| CN | 107657004 A | 2/2018 |
| CN | 108733842 A | 11/2018 |
| CN | 109299328 A | 2/2019 |
| CN | 109657138 A | 4/2019 |
| CN | 110012339 A | 7/2019 |
| CN | 110163066 A | 8/2019 |
| CN | 110619063 A | 12/2019 |

OTHER PUBLICATIONS

Second Office Action dated May 30, 2022 in Chinese Patent Application No. 201910894059.2 with an English translation (11 pages).

First Office Action dated Oct. 28, 2021 in Chinese Patent Application No. 201910894059.2 (9 pages) with an English translation (11 pages).

* cited by examiner

VIDEO PUSHING METHOD AND APPARATUS BASED ON VIDEO SEARCH, AND ELECTRONIC DEVICE

CROSS-REFERENCE TO RELATED APPLICATIONS

This application claims priority to Chinese patent application No. 201910894059.2, filed to the China National Intellectual Property Administration on Sep. 20, 2019, which is incorporated herein by reference in its entirety.

FIELD

The present disclosure relates to the field of computer science, and more particularly, to a video pushing method based on video search, a video pushing apparatus based on video search, and an electronic device.

BACKGROUND

In video display, it is usually divided into an external stream and an internal stream. A video display interface for the external stream (or referred to as an external stream display interface) displays a list of video covers. A user clicks on a video cover to enter the internal stream, and a video content corresponding to the video cover starts to play on a video display interface for the internal stream (or referred to as an internal stream display interface).

When a user searches for a video, a search keyword may have different interpretations in different scenarios. A plurality of types of videos can be found with one search keyword. What only a certain type of video is wanted by the user, the videos pushed by a terminal device to the user in the internal stream or the external stream may not necessarily those matching the user's intention. After the user has watched an internal stream video, the user has to exit to the external stream display interface, in order to re-select another video, he/she wants to watch.

In this regard, the way of pushing videos based on user search keywords brings a lot of search noise, and a large number of videos that are not wanted by a user are recommended, which wastes video resources and negatively affects the user's search experience. At the same time, it is cumbersome to switch between the internal stream and the external stream when videos are recommended to the user in the internal stream, which increases processing time for recommending videos to the user in the internal stream, and reduces the user's operating experience.

SUMMARY

The summary is provided to briefly introduce the concepts, and these concepts will be described in detail in the following specific embodiments. The summary is neither intended to identify the key or essential features of the technical solutions to be protected, nor intended to be used to limit the scope of the technical solutions to be protected.

In a first aspect of the present disclosure, a video pushing method based on video search is provided. The video pushing method includes: transmitting a received search keyword to a server; receiving first video preview information, fed back by the server, of at least two first videos matching the search keyword, and displaying the first video preview information on a first display interface, the at least two first videos including at least two types of videos; in response to receiving a play-triggering operation on first target preview information in the first video preview information, transmitting, to the server, a video-obtaining request carrying identification information of a first target video corresponding to the first target preview information; and receiving at least two second videos and corresponding second video preview information that are fed back by the server based on the video-obtaining request, and displaying a first predetermined number of pieces of preview information in the second video preview information on a second display interface.

In a second aspect of the present disclosure, a video pushing method based on video search is provided. The video pushing method includes: determining, based on a search keyword received from a terminal device, at least two first videos matching the search keyword, the at least two first videos including at least two types of videos; transmitting first video preview information of the at least two first videos to the terminal device; receiving a video-obtaining request transmitted by the terminal device, where the video-obtaining request is generated in response to a play-triggering operation of the first target preview information in the first video preview information, and the video-obtaining request carries identification information of a first target video corresponding to the first target preview information; and determining at least two second videos based on the video-obtaining request, and transmitting the at least two second videos and corresponding second video preview information to the terminal device.

In a third aspect of the present disclosure, a video pushing apparatus is provided. The video pushing apparatus includes: a first transceiver module configured to transmit a received search keyword to a server; a second transceiver module configured to receive first video preview information, fed back by the server, of at least two first videos matching the search keyword, and display the first video preview information on a first display interface, the at least two first videos including at least two types of videos; a third transceiver module configured to transmit, to the server, a video-obtaining request carrying identification information of a first target video corresponding to the first target preview information, in response to receiving a play-triggering operation on first target preview information in the first video preview information; and a display module configured to receive at least two second videos and corresponding second video preview information that are fed back by the server based on the video-obtaining request, and display a first predetermined number of pieces of preview information in the second video preview information on a second display interface.

In a fourth aspect of the present disclosure, a video pushing apparatus is provided. The video pushing apparatus includes a first determination module configured to determine, based on a search keyword received from a terminal device, at least two first videos matching a search keyword, the at least two first videos including at least two types of videos; a first transceiver module configured to transmit first video preview information of the at least two first videos to the terminal device; a second transceiver module configured to receive a video-obtaining request transmitted by the terminal device, where the video-obtaining request is generated in response to a play-triggering operation of the first target preview information in the first video preview information, and the video-obtaining request carries identification information of a first target video corresponding to the first target preview information; and a second determination module configured to determine at least two second videos based on the video-obtaining request, and transmit the at least two second videos and corresponding second video preview information to the terminal device.

In a fifth aspect of the present disclosure, an electronic device is provided. The electronic device includes a memory having a computer program stored thereon, and a processor configured to execute the method according to the first aspect or the second aspect when executing the computer program.

In a sixth aspect of the present disclosure, a computer-readable medium is provided. The computer-readable medium has a computer program stored thereon. The computer program, when executed by a processor, implements the method according to the first aspect or the second aspect.

The technical solutions provided by the present disclosure bring the following beneficial effects.

In the present embodiment, the search keyword is transmitted to the server, the server may feedback first video preview information of at least two first videos matching the search keyword, where the at least two first videos include at least two types of videos; in response to receiving the play-triggering operation of the first target video preview information, the video-obtaining request is transmitted to the server; the server, based on the identification information of the first target video in the video-obtaining request, can feedback the at least two second videos and the corresponding second video preview information; and the first predetermined number of pieces of preview information in the second video preview information is displayed on a second display interface. In this way, the second video can be recommended to the user in the internal stream. The second video is fed back by the server based on the identification information of the first target video, which is a video that meets the user's intention, and the second video is a video that meets the user's intention to a great extent. Accordingly, when recommending videos based on the search keyword in the internal stream, videos that are more in line with the user's intention can be recommended, preventing a large number of videos that do not meet the user's intentions from being pushed to the user, thereby saving video resources and improving the user's search experience. In addition, in the present disclosure, the second video that meets the user's intention can be played on the second display interface (i.e., the internal stream display interface) without returning to the first display interface (i.e., the external stream display interface), thereby shortening the processing time of recommending videos that meet the user's intention to the user in the internal stream, and reducing the complexity of recommending videos to the user in the internal stream.

BRIEF DESCRIPTION OF DRAWINGS

The above and other features, advantages, and aspects of various embodiments of the present disclosure will become more apparent in conjunction with the accompanying drawings and with reference to the following specific implementations. Throughout the drawings, the same or similar reference signs indicate the same or similar elements. It should be understood that the drawings are illustrative, and members and elements are not necessarily drawn to scale.

DESCRIPTION OF EMBODIMENTS

Figure 1:
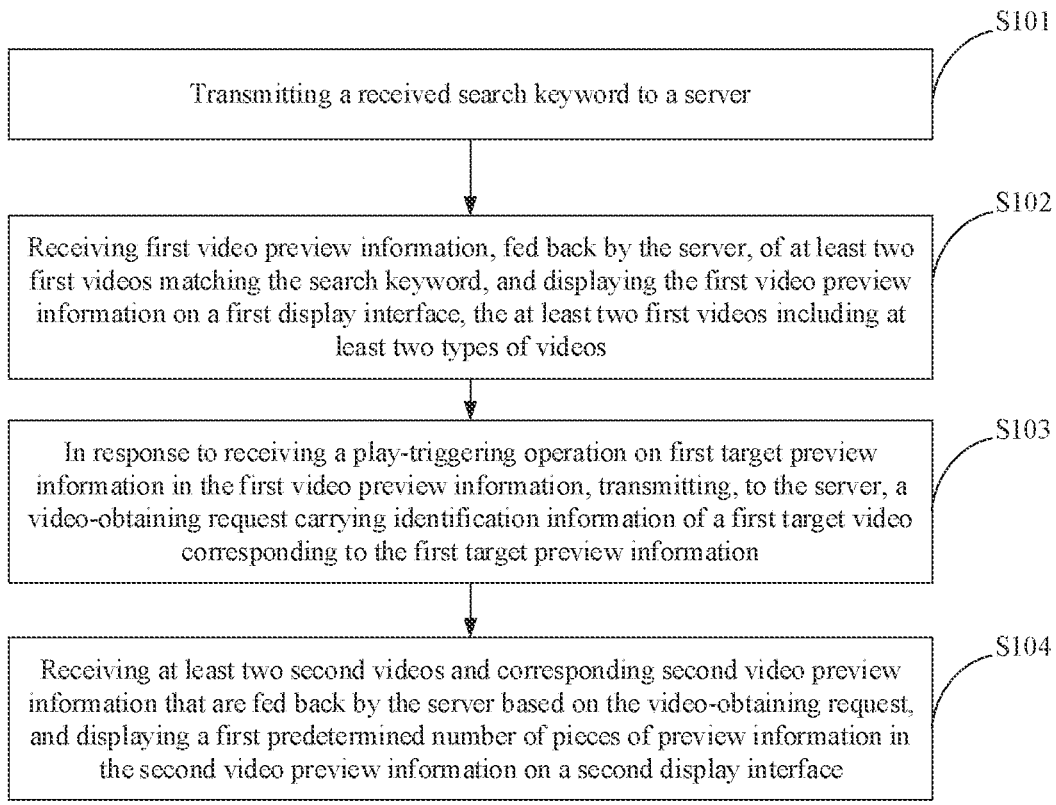
FIG. 1 is a schematic diagram of a video pushing method based on video search according to an embodiment of the present disclosure.

Hereinafter, embodiments of the present disclosure will be described in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided to help a more thorough and complete understanding of the present disclosure. It should be understood that the drawings and embodiments of the present disclosure are only used for illustration purposes, and are not used to limit the protection scope of the present disclosure.

It should be understood that steps recited in the method embodiments of the present disclosure may be executed in different orders and/or in parallel. In addition, method embodiments may include additional steps and/or omit to perform the illustrated steps. The scope of the present disclosure is not limited in the aspect.

The term "including" and its variants as used herein are open-ended including, i.e., "including, but not limited to". The term "based on" means "at least in part based on". The term "an embodiment" means "at least one embodiment"; the term "another embodiment" means "at least one additional embodiment"; the term "some embodiments" means "at least some embodiments". Related definitions of other terms will be provided in the following description.

It should be noted that the terms "first" and "second" mentioned in the present disclosure are only used to distinguish apparatuses, modules or units, rather than indicating that these apparatuses, modules or units are different apparatuses, modules or units, and they are not used to limit the order or interdependence of functions performed by these apparatuses, modules or units.

It should be noted that modifications of "a" and "a plurality of" mentioned in the present disclosure are illustrative and not restrictive, and should be understood as "one or more" by those skilled in the art, unless clearly indicated otherwise in the context.

Names of messages or information exchanged between a plurality of apparatuses in the embodiments of the present disclosure are only used for illustrative purposes, and are not used to limit the scope of these messages or information.

In an existing video recommendation solution, after a user has watched a certain internal stream video, the user needs to exit to an external stream display interface in order to re-select another video he/she wants to watch. In this way, the terminal can only recommend videos that meet the user's intention in the internal stream based on a user operation. It takes relatively long time and is very difficult to recommend videos that meet the user's intention to the user in the internal stream. At the same time, when the terminal searches for videos based on a keyword entered by the user, the keyword may have different interpretations in different fields or scenarios. Thus, based on the keyword entered by the user, in addition to videos that meet the user's intention, videos that are unrelate to the user's intention may be found and recommended on an internal stream display interface, thereby resulting in a waste of video resources.

The above technical problems are solved by the technical solutions of the present disclosure, which are described in detail below with specific embodiments. The following specific embodiments can be combined with each other, and the same or similar concepts or processes may not be repeated in some embodiments. The embodiments of the present disclosure will be described below with reference to the accompanying drawings.

It should be noted that videos (including a first video and a second video) in the present disclosure can be videos in a Feed video stream, and the Feed video stream is a video stream formed by video contents published by a number of information sources subscribed by a user on a network platform, which may be a server. In a Feed scenario, friend or an object of interest is used as the information source, and the video contents are updates (the published video contents) of the friend or the object of interest. Other matching users can be determined as the information sources based on the user portrait, and contents from the matching information sources may be pushed to the user. When the user has many friends or the friends post the updates frequently enough, the user can continuously receive the video content.

An external stream in the present disclosure refers to a Feed video stream, which merely pushes video preview information to the user instead of directly pushing the videos to the user. A corresponding external stream display interface displays a video cover, a list, or a poster. If the user wants to watch a video, the user has to enter an internal stream. An internal stream in the present disclosure refers to a Feed video stream of videos directly pushed to the user. A corresponding internal stream display interface directly plays a video to the user. For example, the user clicks on a certain piece of video preview information on the external stream display interface to enter the internal stream, and the video is played in the internal stream display interface.

Referring to FIG. 1, the present disclosure provides a video pushing method based on video search. The method may be executed by an electronic device. The electronic device may be a terminal device. The terminal device may be a desktop device or a mobile terminal. The method of the present disclosure includes the following steps.

At step S101, a received search keyword is transmitted to a server.

At step S102, first video preview information, fed back by the server, of at least two first videos matching the search keyword is received, and the first video preview information is displayed on a first display interface, where the at least two first videos include at least two types of videos.

A user inputs a search keyword into a search box of the terminal device and clicks a search button. The terminal device receives the search keyword entered by the user, and transmits the keyword to the server, such that the server can determine video contents matching the search keyword. One search keyword may have different interpretations in different scenarios, and thus a plurality of types of videos may be found based on one search keyword.

The server can find at least two first videos based on the search keyword. The at least two first videos include at least two types of videos. At the same time, the at least two first videos correspond to the video preview information in one-to-one correspondence. The first video preview information includes video preview information corresponding to the at least two first videos in one-to-one correspondence. The terminal device receives the first video preview information fed back by the server, and displays the first video preview information on the first display interface.

For example, if the user searches for a keyword "apple", the server may retrieve videos involving the Apple mobile phone as well as videos involving the fruit apple. The first display interface of the terminal displays the preview information of the videos involving the Apple mobile phone and the preview information of the videos involving the fruit apple.

In the present embodiment, the video preview information refers to a cover, poster, or list page of the video, and the first display interface is the above-mentioned external stream display interface.

At step S103, in response to receiving a play-triggering operation for first target preview information in the first video preview information, a video-obtaining request carrying identification information of a first target video corresponding to the first target preview information is transmitted to the server.

For example, the above-mentioned first display interface displays the first video preview information corresponding to the at least two first videos. When the terminal device receives the user's play-triggering operation for the first target preview information in the first video preview information, the terminal device transmits a video-obtaining request to the server. The video-obtaining request carries the identification information of the first target video corresponding to the first target preview information. It can be understood that identification information of a video can uniquely indicate the video.

In the present embodiment, the play-triggering operation may be the user's click operation on the video preview information of a video, which may be the first target preview information.

At step S104, at least two second videos and corresponding second video preview information fed back by the server based on the video-obtaining request are received, and a first predetermined number of pieces of preview information in the second video preview information is displayed on a second display interface.

After the server receives the video-obtaining request, the server determines at least two second videos. Similarly, the at least two second videos correspond to the video preview information in one-to-one correspondence, and the second video preview information includes the video preview information corresponding to the at least two second videos in one-to-one correspondence. The server transmits the at least two second videos and the second video preview information to the terminal device. After receiving the at least two second videos and the second video preview information, the terminal device adds the at least two second videos to its own cache. Due to the limited size of a display interface of the terminal device, the terminal device may display the first predetermined number of pieces of preview information in the second video preview information on the second display interface. The first predetermined number is preset by the terminal device. The predetermined number of pieces of preview information may be part of preview information in the second video preview information.

In the present embodiment, the search keyword is transmitted to the server, the server may feedback first video preview information of at least two first videos matching the search keyword, where the at least two first videos include at least two types of videos; in response to receiving the play-triggering operation of the first target video preview information, the video-obtaining request is transmitted to the server; the server, based on the identification information of the first target video in the video-obtaining request, can feedback the at least two second videos and the corresponding second video preview information; and the first predetermined number of pieces of preview information in the second video preview information is displayed on a second display interface. In this way, the second video can be recommended to the user in the internal stream. The second video is fed back by the server based on the identification information of the first target video, which is a video that meets the user's intention, and the second video is a video that meets the user's intention to a great extent. Accordingly, when recommending videos based on the search keyword in the internal stream, videos that are more in line with the user's intention can be recommended, preventing a large number of videos that do not meet the user's intentions from being pushed to the user, thereby saving video resources and improving the user's search experience. In addition, in the present disclosure, the second video that meets the user's intention can be played on the second display interface (i.e., the internal stream display interface) without returning to the first display interface (i.e., the external stream display interface), thereby shortening the processing time of recommending videos that meet the user's intention to the user in the internal stream, and reducing the complexity of recommending videos to the user in the internal stream.

In some embodiments, said receiving the first video preview information, fed back by the server, of the at least two first videos matching the search keyword includes: receiving the first video preview information, fed back by the server, of at least two first videos ranked based on video popularity and matching the search keyword. The at least two second videos include a video of a same video type as the first target video and having a video similarity with the first target video satisfying a first predetermined condition. The at least two second videos further includes at least one of top N-ranked first videos based on the video popularity in the at least two first videos, and a video screened from a video database and having a video similarity with the top N-ranked first videos satisfying a second predetermined condition, where N is a positive integer.

In the present embodiment, the videos recommended on the first display interface or on the external scream display interface may be videos recommended to the user based on a real-time video popularity. The terminal device receives the first video preview information fed back by the server in the following manner. After the at least two first videos are determined by the server based on the search keyword, the server will rank the at least two first videos based on the real-time video popularity. The real-time video popularity is determined by at least one of the real-time number of clicks (or views), the real-time number of forwarding, and the real-time number of sharing. Based on the ranking result of the at least two first videos, the server ranks the video preview information corresponding to the at least two first videos in one-to-one correspondence, and then transmits the first video preview information obtained by ranking to the terminal device. Thus, the terminal device displays the ranked first video preview information on the first display interface, and the preview information corresponding to the higher-ranked first videos can be displayed to the user first.

In the present embodiment, the process of determining the at least two first videos based on the search keyword and ranking the at least two first videos can be conducted by a search engine of the server. A search result of the search engine may take the real-time video popularity or timeliness into consideration, and the ones ranked higher may not necessarily be the videos that the user is really interested in.

Based on the above-mentioned ranking of the at least two first videos, the at least two second videos determined by the server may include videos similar to the first target video actively selected by the user, and videos determined based on top one or more first videos according to the ranking result ranked by the server. The process of determining the at least two second videos may be completed by a recommendation engine of the server. Specifically, the server determines the second videos in three possible manners, which will be described individually as below.

It should be noted that the video similarity can be used to measure a similarity (or correlation) between video contents of two videos. For example, if both videos involve watermelon-cutting methods, the similarity therebetween is relatively high; and if one video involves sports and the other video involves movies or television shows, the similarity therebetween is relatively low.

Manner 1:

The primary principle for the server to determine the second video is to determine videos that the user may be interested in. The first target video is actively selected by the user and must be the video that the user is interested in. Based on the first target video, the server can determine the at least two second videos similar to the first target video.

Specifically, based on the identification information of the first target video in the video-obtaining request, the server determines the first target video selected by the user. The server determines candidate videos having a video similarity with the first target video satisfying the first predetermined condition. By setting the first predetermined condition, the candidate videos that satisfy the user's intention can be determined by the server. At the same time, as described above, different types of videos may be found based on the search keyword, the videos recommended in the internal stream may include videos belonging to a different type from the first target video. That is, the candidate videos may include the videos belonging to the different video type from the first target video, which obviously do not meet the user's intention. Based on the video type of the first target video, the server can determine the at least two second videos belonging to the same video type as the first target video from the candidate videos.

In the present embodiment, a possible situation is that the candidate videos and the at least two second videos are the same videos, that is, the videos having a similarity with the first target video greater than the first predetermined condition belong to the same video type as the first target video. Of course, the at least two second videos may be some of the candidate videos.

In the present embodiment, a video similarity between the two videos can be characterized by a positional distance between two videos in a similarity algorithm model. That is, a calculated distance value between the two videos is a similarity value of the two videos. The distance value can be normalized to [0, 1], where "0" indicates that the two videos are the farthest away, and the corresponding two videos have the lowest similarity, and "1" indicates that the two videos are the closest to each other, and the corresponding similarity is the highest. Specifically, the server determines the candidate videos having a video similarity with the first target video satisfying the first predetermined condition in a specific manner, as described below.

The similarity algorithm model is stored in the server. The similarity algorithm model can be used as a functional module of the server. At the same time, a large number of videos is stored in a pre-stored video database of the server. Each video and the first target video have corresponding coordinates (usually coordinates of a two-dimensional coordinate system) in the similarity algorithm model. The server determines the coordinates of the first target video in the similarity algorithm model as well as the coordinates of each video in the pre-stored video database in the similarity algorithm model at the same time. For one video of the video databases, the video similarity is calculated in such a manner that to a cosine similarity between the coordinates of the video and the coordinates of the first target video is calculated. The cosine similarity is the video similarity between this video and the first target video. In this way, the video similarity between each video in the pre-stored video database and the first target video can be determined, so as to determine the candidate videos having the video similarity satisfying the first predetermined condition in the video database. The number of the candidate videos can be one or more.

Usually, the distance value between two videos within a range of [0.7, 0.8] indicates that the video similarity of these two videos satisfies the first predetermined condition. In a possible situation, the first predetermined condition can be selected as [0.5, 0.8], and the candidate videos can be determined based on range [0.5, 0.8] and then recommended to the user in the internal stream, to investigate whether the user is really interested in. Then, the value range of the first predetermined condition can be further adjusted, until a value range is finally found to ensure that the second video determined based on the value range is the video that the user is really interested in.

For example, the coordinates of the first target video are (X1, Y1), and coordinates of a certain video in the video database are (X2, Y2). The cosine similarity of the two coordinates is calculated. If the calculated cosine similarity is within the range from 0.7 to 0.8, it is considered that the first predetermined condition is satisfied and that the video is the second video.

Manner 2:

For determining the second video, in addition to the video that the user is interested in, the server can further take a real-time video popularity of videos into consideration.

Specifically, in addition to the second video determined in the above-mentioned manner 1, the at least two second videos may further include the top N-ranked first videos based on the video popularity among all the first videos. Since all the first videos found by the search keyword are ranked in advance by the server, the server can take the top N-ranked first videos and add them to the at least two second videos. The top N-ranked first videos, together with the second video determined in the above-mentioned manner 1, serve as the recommended videos in the internal stream. The specific value of N is preset by the server, and N is a positive integer.

Manner 3:

Similarly, for determining the second video, in addition to the video that the user is interested in, the server can further take a real-time video popularity of videos into consideration, and based on the real-time video popularity, the second video is determined in a manner different from the above manner 2.

Specifically, in addition to the second video determined in the above manner 1, the at least two second videos further include a video having a video similarity satisfying a second predetermined condition, where the video similarity is determined by the top N-ranked first videos based on the video popularity in all first videos.

Since all the first videos found by the search keyword are ranked in advance by the server, the server can select the top N-ranked first videos (i.e., the top N-ranked first videos recommended on the first display interface). Similarly, each of these top N-ranked first videos has corresponding coordinates in the similarity algorithm model, and specific parameter coordinates are calculated based on the coordinates of the top N-ranked first videos. The specific parameter coordinates may be average coordinates or variance coordinates of the top N-ranked first videos. For example, the similarity algorithm model stores the coordinates of each video in the video database, and a similarity between the specific parameter coordinates and the coordinates of each video in the video database is calculated. If the calculated similarity between coordinates of one or more videos and the specific parameter coordinates satisfies the second predetermined condition, the one or more videos are determined as one or more second videos and added it/them to the at least two second videos, which, together with the second video determined in the above manner 1, serve as the recommended videos in the internal stream.

Similarly, the specific value of N is preset by the server, and N is a positive integer. The second predetermined condition and the first predetermined condition may be the same or different.

Take the specific parameter coordinates being the average coordinates as an example. If N is 5, the server takes the top 5-ranked videos recommended on the first display interface to the user. The coordinates of these top 5-ranked videos are (x1, y1), (x2, y2), (x3, y3), (x4, y4), and (x5, y5), respectively, the average coordinates of these 5 coordinates are $$\left[\frac{(x1+x2+x3+x4+x5)}{5}, \frac{(y1+y2+y3+y4+y5)}{5}\right] = (M, N).$$

The coordinates of a video in the video database are (x6, y6), a similarity between (M, N) and (x6, y6) is calculated, and if the calculated similarity is within the range of [0.7, 0.8], it is considered that the second predetermined condition is satisfied, and this video is added to the at least two second videos.

In the present embodiment, the manners for determining the at least two second videos are introduced. The first target video is actively selected by the user, and the second video having a similarity with the first target video satisfying the first predetermined condition is of interest to the user to a great extent. At the same time, the second video is of the same video type as the first video, which further ensures that the second video meets the user's intension. Further, the top N-ranked first videos recommended on the external stream display interface can be added to the at least two second videos to ensure the timeliness of the second video, or the average coordinates or variance coordinates of the top N-ranked first videos recommended on the external stream display interface are calculated to determine the similar videos, which are then added to the at least two second videos, thereby ensuring the diversity and relevance of the second video.

It can be seen that the second videos determined in the present embodiment are those meeting the user intension, and the second display interface displays the video preview information corresponding to the at least two second videos. The second video preview information on the second display interface can be operated by the user, so as to play a corresponding second video. In this way, without requiring the user to exit the first display interface, the user can play one or more second videos that meet the user's intention on the second display interface, which saves processing time of recommending the desired videos to the user in the internal stream, and at the same time, the user can be provided with a better search experience.

In some embodiments, the second display interface includes a first region and a second region; subsequent to said transmitting, to the server, the video-obtaining request carrying the identification information of the first target video corresponding to the first target preview information, the method further includes: receiving the first target video fed back by the server; and playing the first target video in the first region of the second display interface; said displaying the first predetermined number of pieces of preview information in the second video preview information on the second display interface includes: displaying the first predetermined number of pieces of preview information in the second video preview information in the second region of the second display interface.

The terminal device can only play one video within a period of time, that is, the terminal device cannot play two videos at the same time. The second display interface of the terminal device is divided into the first region and the second region. The first region is a video playing region, and the second region is a display region of the video preview information. The user can perform a sliding operation on the second display interface to change the video to be played and the displayed video preview information on the second display interface. The video playing region and the display region are not fixed. Positions of the first region and the second region on the second display interface are not limited. The second region can be divided into a plurality of small regions for displaying a plurality of pieces of video preview information. When a video is played in the first region, the second region displays the user a list, cover, or poster of the video.

After the terminal device transmits the video-obtaining request carrying the identification information of the first target video to the server, the server feeds back the first target video to the terminal device, so that the terminal device can play the first target video in the first region of the second display interface, and at the same time, the terminal device displays the first predetermined number of pieces of preview information in the second video preview information in the second region. That is, the first target video is played and the first predetermined number of pieces of preview information is displayed simultaneously.

Figure 2:
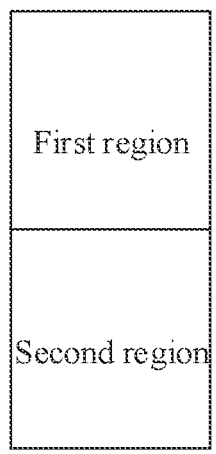
FIG. 2 illustrates a possible situation of region division of a second display interface in the present disclosure.

In the present embodiment, FIG. 2 illustrates a possible situation of the first region and the second region on the second display interface.

In some embodiments, subsequent to said displaying the first predetermined number of pieces of preview information in the second video preview information in the second region of the second display interface, the method further includes: in response to receiving a sliding operation of a user on the second display interface, determining a second target video from the at least two second videos, and determining a second predetermined number of pieces of preview information from the second video preview information; and playing the second target video in the first region of the second display interface, and displaying the second predetermined number of pieces of preview information in the second region of the second display interface.

The at least two second videos and the corresponding second video preview information received by the terminal device are ranked. The ranking process will be described in the following embodiments. When the terminal device receives the user's sliding operation in a length direction of the display interface on the second display interface, the terminal device gradually displays the video preview information of the second video that has not yet been displayed to the user based on the ranking result. That is, the user can perform the sliding operation to update the video preview information of the second video displayed on the second display interface. When the user stops the sliding operation, the terminal device determines the second target video that the user wants to play from the at least two second videos. The sliding operation based on such a standard that, in a process of the user performing the sliding operation, a certain second video, the video preview information of which is completely displayed to the user, or the video preview information of which is completely presented on the second display interface, is the second target video. Thus, the terminal device displays the second target video in the first region of the second display interface. If the video preview information of two second videos is completely displayed to the user in the process of the user performing the sliding operation, the second video with higher rank will be played.

At the same time, when the sliding operation stops, the terminal device displays the second predetermined number of pieces of preview information to the user in the second region of the second display interface. The second predetermined number is preset by the terminal device. In this case, the preview information in the second region can be only some pieces of preview information, that is, the user can only see part of a video cover (or poster, or list).

Figure 3:
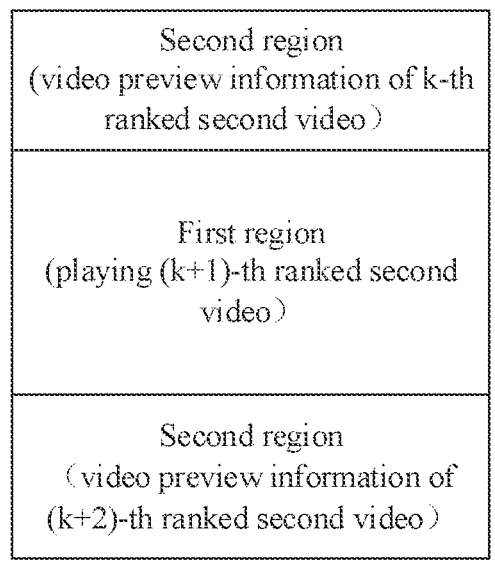
FIG. 3 illustrates another possible situation of region division of a second display interface in the present disclosure.

For example, the above-mentioned second region can be divided into a plurality of small regions for displaying a plurality of pieces of video preview information. In the present embodiment, FIG. 3 illustrates a possible situation of the first region and the second region on the second display interface. The second region in the second display interface is divided into two small regions. The small regions may have different sizes. The first region is larger than each small region. One small region displays the video preview information of a k-th ranked second video, and only part of the video preview information is displayed. The first region displays a (k+1)-th ranked second video (that is, the second target video). The other small region displays video the preview information of a (k+2)-th ranked second video, and only part of the video preview information is displayed.

In the present embodiment, the user performs the sliding operation on the second display interface to update the video preview information displayed on the second display interface and play the second target video simultaneously. In this way, the second target video that the user may be interested in can be played on the internal stream display interface without requiring the user to exit the internal stream display interface. Therefore, the video that meets the user's intension can be recommended to the user, while the user does not need to exit the internal stream display interface, thereby reducing the processing time of recommending the desired video to the user in the internal stream.

In some embodiments, said receiving the at least two second videos and the corresponding second video preview information that are fed back by the server includes: receiving at least two second videos and corresponding second video preview information that are ranked based on user preference and fed back by the server; and said displaying the first predetermined number of pieces of preview information in the second video preview information on the second display interface includes: displaying the first predetermined number of pieces of preview information, corresponding to the first predetermined number of top-ranked videos in the at least two second videos, in the second video preview information on the second display interface.

In the present embodiment, after the server determines the at least two second videos, the server can further rank the at least two second videos in a personalized order based on the user preference. The user preference is determined by at least one of attribute information of the user and historical viewing records of videos watched by the user. The user preference can be determined based on other factors, which is not limited herein.

The attribute information of the user may be at least one of the gender, age, and occupation of the user. For example, if the user is female, the videos involving movie or television shows in the at least two second videos may be ranked higher; and if the user is male, the sports videos and game videos in the at least two second videos may be ranked higher. The historical viewing records of videos watched by the user can be at least one of a time length of watching, a progress of a video watched by a user, and a video type of videos watched more frequently in the history. The video type of videos watched more frequently by the user may be a video type watched by the user with a frequency greater than a threshold. For example, if the progress of a certain video watched by the user is higher than a certain percent and the certain video is a video of car advertisement, the videos involving car advertisement in the at least two second videos are ranked higher. If the user watches a certain video for a time length greater than a certain time length threshold and the certain video is a dance video, the videos involving dance video in the at least two second videos is ranked higher. If the user watches movies or television shows more frequently, the videos involving movies or television shows in the at least two second videos can be ranked higher.

The server ranks the video preview information corresponding to the at least two second videos based on the rank of the at least two second videos, so as to transmit the ranked second video preview information to the terminal device. At the same time, the server will transmit the at least two ranked second videos to the terminal device. The above-mentioned terminal device caches the at least two second videos, and displays the second predetermined number of pieces of preview information on the second display interface based on the ranking result.

In the present embodiment, the server can rank the at least two second videos based on the user preference, so that the terminal device displays the video preview information on the second display interface based on the ranking result. In this way, the second video that satisfies the user preference can be likely to be seen by the user.

In some embodiments, duplicated videos shall be eliminated from the videos recommended on the internal stream display interface and the videos recommended on the external stream display interface. Specifically, the videos whose video preview information has been displayed by the terminal device on the first display interface, i.e., the videos that have been recommended on the external stream display interface, are high-quality videos screened by the server. If the user has not watched them yet, the videos that have been recommended on the external stream display interface can continue to be recommended on the internal stream display interface, that is, these videos are determined as the second videos recommended to the user. For example, the top N-ranked first videos are determined to be added to the at least two second videos. Within a first predetermined time length, the videos on the external stream display interface that have been selected by the user and played will not be recommended on the internal stream display interface anymore, these videos are determined not to be the second videos recommended to the user). The videos that have been played on the internal stream display interface will not be recommended on the external stream display interface within a second predetermined time length. The first predetermined time length and the second predetermined time length can be the same or different.

Figure 4:
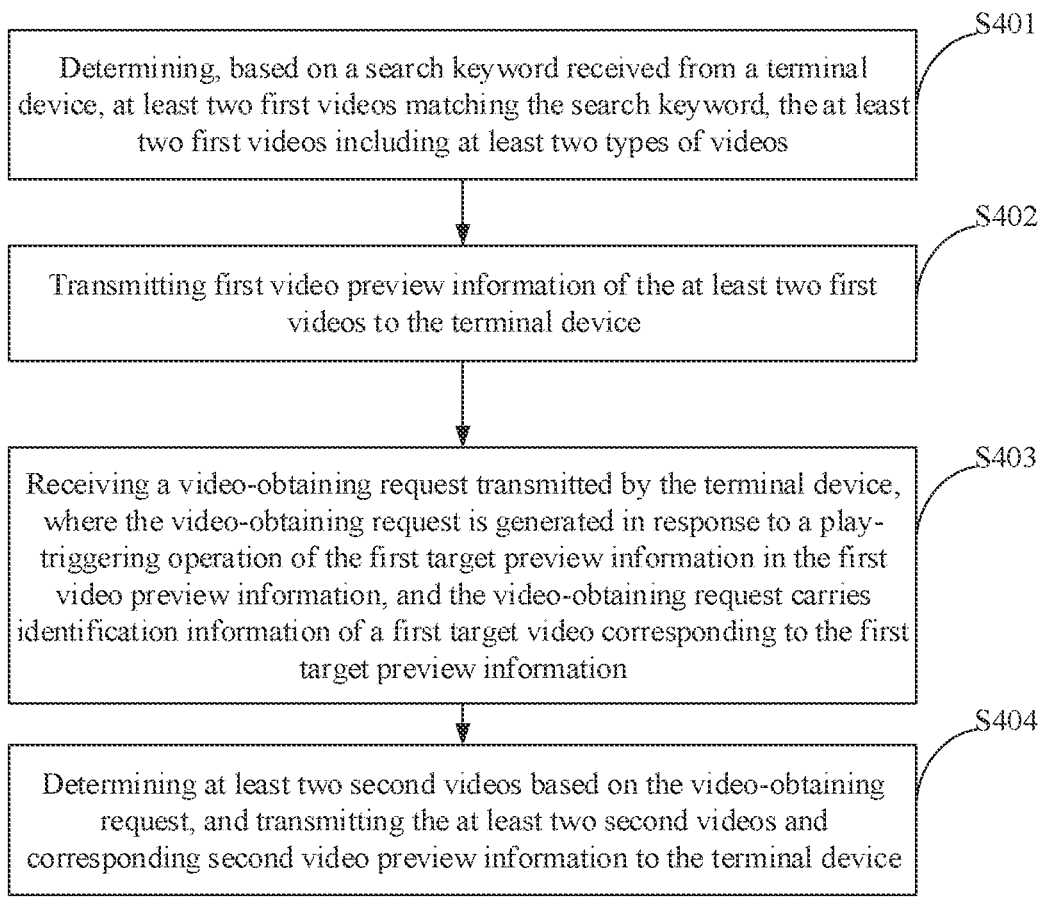
FIG. 4 is a schematic diagram of a video pushing method based on video search according to another embodiment of the present disclosure.

The present disclosure is explained from the perspective of a server, as below. As illustrated in FIG. 4, the present disclosure provides a video pushing method based on video search. The method may be executed by an electronic device, and the electronic device may be a server. The method specifically includes the following steps.

At step S401, based on a search keyword received from a terminal device, at least two first videos matching the search keyword are determined, where the at least two first videos include at least two types of videos.

At step S402, first video preview information of at least two first videos is transmitted to the terminal device.

At step S403, a video-obtaining request transmitted by the terminal device is received. The video-obtaining request is generated in response to a play-triggering operation for the first target preview information in the first video preview information, and the video-obtaining request carries first target preview information of a first target video corresponding to the first target preview information.

At step S404, at least two second videos are determined based on the video-obtaining request, and the at least two second videos and corresponding second video preview information are transmitted to the terminal device.

In some embodiments, subsequent to said determining the at least two first videos matching the search keyword, the method further includes: ranking the at least two first videos based on video popularity; and said transmitting the first video preview information of the at least two first videos to the terminal device includes: transmitting first video preview information of the at least two ranked first videos to the terminal device.

In some embodiments, said determining the at least two second videos based on the video-obtaining request includes any one of the following circumstances:

determining, based on the identification information in the video-obtaining request, candidate videos having a video similarity with the first target video satisfying a first predetermined condition, and determining, from the candidate videos, videos of a same video type with the first target video as the at least two second videos;

determining, as the at least two second videos, top N-ranked first videos based on the video popularity and videos, determined from the candidate videos, of a same video type with the first target video, where N is a positive integer; and determining, as the at least two second videos, videos, determined from the candidate videos, of a same video type with the first target video, and a video screened from a video database and having a video similarity with the top N-ranked first videos satisfying a second predetermined condition.

In some embodiments, said determining, based on the identification information in the video-obtaining request, the candidate videos having the video similarity with the first target video satisfying the first predetermined condition includes: determining the first target video based on the identification information in the video-obtaining request; based on coordinates, in a similarity algorithm model, of the first target video and each video in a prestored database, calculating a video similarity between the first target video and each video; and determining, from the video database, the candidate videos having the video similarity with the first target video satisfying the first predetermined condition, based on the video similarity between the first target video and each video.

In some embodiments, said determining, as the at least two second videos, the video screened from the video database and having the video similarity with the top N-ranked first videos satisfying the second predetermined condition includes:

determining, based on coordinates of the top N-ranked first videos in the similarity algorithm model, specific parameter coordinates corresponding to the top N-ranked first videos, where the specific parameter coordinates include average coordinates of the top N-ranked first videos or variance coordinates of the top N-ranked first videos;

determining coordinates of each video in the prestored database in the similarity algorithm model, and calculating a similarity between the coordinates of each video and the specific parameter coordinates; and determining, based on the similarity, the two second video screened from the video database and having the coordinates with the calculated similarity satisfying the second predetermined condition.

In some embodiments, subsequent to determining the at least two second videos based on the video-obtaining request, the method further includes: ranking the at least two second videos based on user preference, where the user preference is determined by at least one of user's attribute information and user's historical viewing record; and transmitting, to the terminal device, the at least two second videos ranked based on the user preference and corresponding second video preview information.

It should be noted that the method described in the present embodiment is essentially the same technical solution as the method illustrated in FIG. 1 above, except that the method illustrated in FIG. 1 is executed by the terminal device. The method described in the present embodiment is executed by the server. Therefore, the solution of the method described in the present embodiment and alternative embodiments may refer to the description of the solution of the method illustrated in FIG. 1 and alternative embodiments in the foregoing for details, which will not be repeated herein.

In the present embodiment, after the server receives the video-obtaining request carrying the identification information of the first target video, which is actively selected by the user and is wanted by the user, the server determines at least two second videos having the video similarity with the first target video satisfying the first predetermined condition, where the second video is of interest to the user to a great extent. At the same time, the second video is of the same video type as the first video, which further ensures that the second video meets the user's intension. The server transmits the at least two second videos and the corresponding second video preview information to the terminal device, so that videos that are more in line with the user's intention can be recommended in the internal stream based on the search keyword, preventing a large number of videos that do not meet the user's intentions from being pushed to the user, thereby saving video resources and improving the user's search experience. In addition, in the present disclosure, the second video that meets the user's intention can be played on the second display interface (i.e., the internal stream display interface) without returning to the first display interface (i.e., the external stream display interface), thereby shortening the processing time of recommending videos that meet the user's intention to the user in the internal stream.

Figure 5:
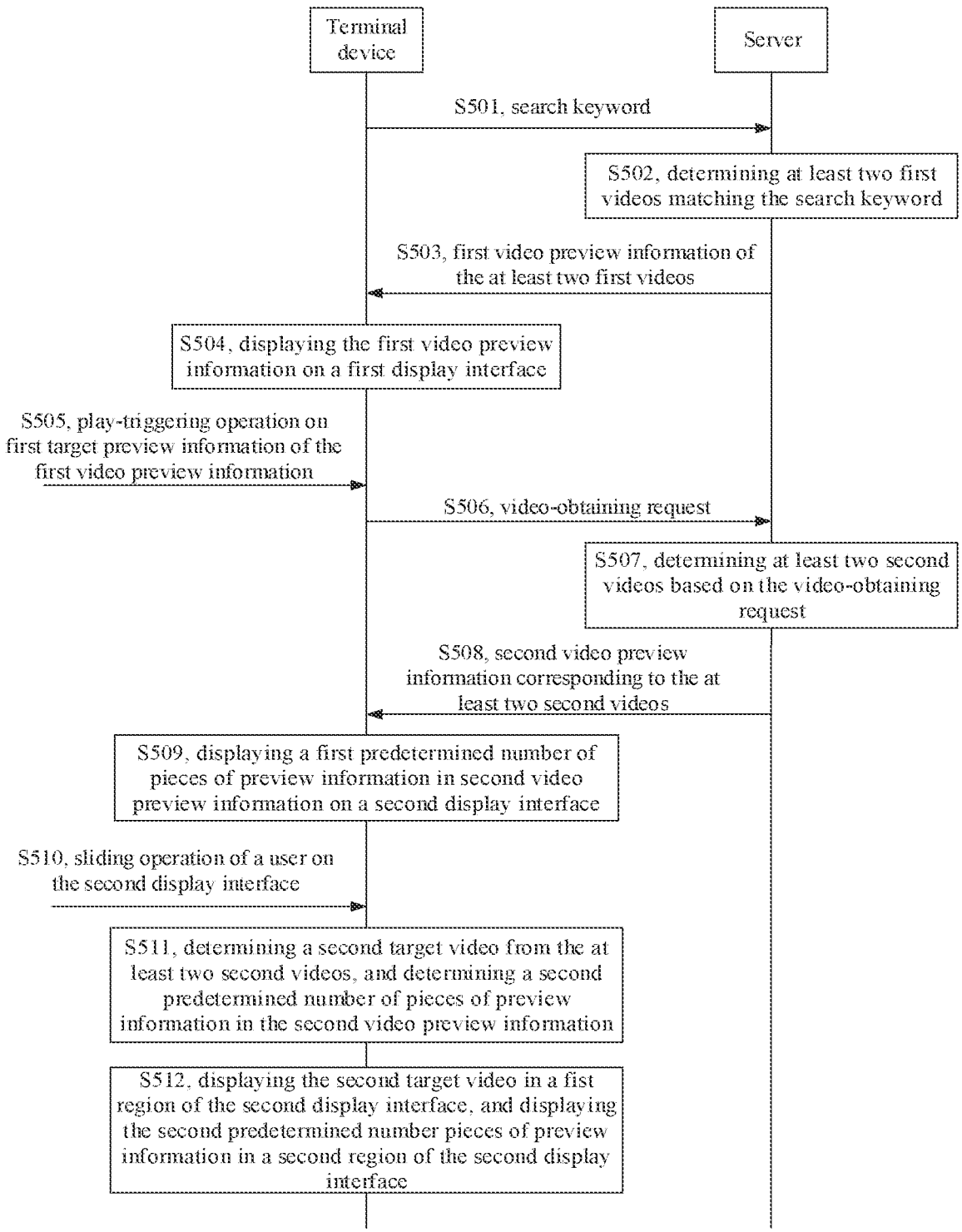
FIG. 5 is a schematic diagram of a video pushing method based on video search according to another embodiment of the present disclosure.

Referring to FIG. 5, a solution of the present disclosure will be described below from the perspective of interaction between the terminal device and the server.

At step S501, the terminal device transmits a received search keyword to the server.

At step S502, the server determines at least two first videos matching the search keyword.

At step S503, the server transmits first video preview information of the at least two first videos to the terminal device.

At step S504, the terminal device displays the first video preview information on a first display interface.

At step S505, the terminal device receives a user's play-triggering operation on first target preview information in the first video preview information.

At step S506, the terminal device transmits a video-obtaining request to the server, the video-obtaining request carrying identification information of a first target video corresponding to the first target preview information.

At step S507, at least two second videos are determined based on the video-obtaining request.

At step S508, the at least two second videos and corresponding second video preview information are transmitted to the terminal device.

At step S509, the terminal device displays a first predetermined number of pieces of preview information in the second video preview information on a second display interface.

At step S510, the terminal device receives the user's sliding operation on the second display interface.

At step S511, the terminal device determines a second target video from the at least two second videos, and determines a second predetermined number of pieces of preview information from the second video preview information.

At step S512, the terminal device plays the second target video in a first region of the second display interface, and displays the second predetermined number of pieces of preview information in a second region of the second display interface.

It should be noted that the method described in the present embodiment is essentially the same technical solution as the method illustrated in FIG. 1 or FIG. 4 in the foregoing description. Therefore, the method described in the present embodiment may refer to the foregoing description of the solution of the method illustrated in FIG. 1 or FIG. 4 and the alternative embodiments. For the achieved effects of the method in the present embodiment, reference may be made to the description of the technical effects of the method illustrated in FIG. 1 or FIG. 4, which will not be repeated herein.

The present disclosure can be applied to pushing of Feed video streams in a Feed scenario. The application scenario of the present disclosure can be described below with reference to FIG. 6.

A user enters a search keyword in a search interface of a terminal device and clicks on a search button. The terminal device transmits the search keyword to a server. A recommendation engine of the server finds at least two feed stream videos of at least two video types, which are determined as the videos to be recommended on an external stream display interface. Based on video popularity, the at least two feed stream videos are ranked as a feed stream video 1, a feed stream video 2, . . . , a feed stream video n. The server transmits the correspondingly ranked video preview information to the terminal device.

Figure 6:
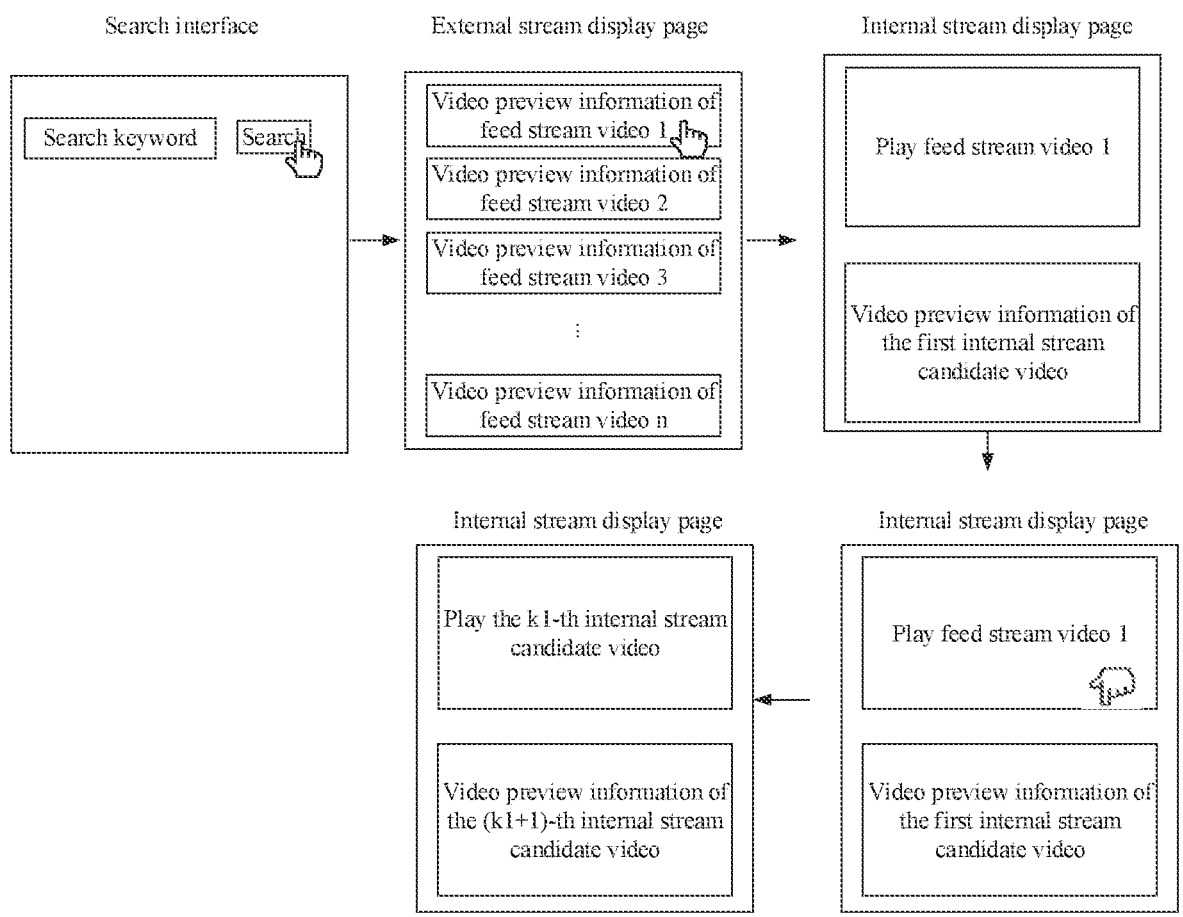
FIG. 6 is a schematic diagram illustrating a scenario of a video pushing method based on video search in the present disclosure.

As illustrated in FIG. 6, the correspondingly ranked video preview information on the external stream display interface of the terminal device is sequentially ranked as: video preview information of feed stream video 1, video preview information of feed stream video 2, . . . , video preview information of feed stream video n. The user clicks on the video preview information of feed stream video 1, and the terminal device transmits the user's request to the server. A recommendation engine of the server determines a video having a video similarity with feed stream video 1 satisfying a predetermination conditions and add the video to a set of internal stream candidate videos. In addition, three feed stream videos corresponding to the top-ranked feed stream video 2 to feed stream video 4 can be added to the set of internal stream candidate videos. In this case, the three feed stream videos are as an example, which may actually be more or less than three feed stream videos. Alternatively, average coordinates of the above three top-ranked feed stream videos are calculated at the same time, a video similarity between each video in a video database and the average coordinates can be calculated to determine similar videos to be added to the set of internal stream candidate videos. The server ranks videos in the set of internal stream candidate videos based on user preference. The videos in the set of internal stream candidate videos are feed stream videos. The server transmits the set of ranked internal stream candidate videos and corresponding video preview information to the terminal device, and meanwhile, transmits feed stream video 1 to the terminal device in response to the user's request.

The terminal device switches to the internal stream display interface, and plays feed stream video 1 on an upper portion of the internal stream display interface. At the same time, due to the limited area of the internal stream display interface, the terminal device displays video preview information corresponding to the first-ranked internal stream candidate video in the set of internal stream candidate videos in another region of the internal stream display interface. The user can perform a sliding operation on the internal stream display interface to update the video preview information of the internal stream candidate videos presented on the internal stream display interface. If video preview information of a certain internal stream candidate video is completely displayed on the internal stream display interface, the certain internal stream candidate video can be played. As illustrated, two pieces of video preview information of the $k_1$-th ranked internal stream candidate video and the $(k_1+1)$-th ranked internal stream candidate video are completely displayed, and thus the $k_1$-th internal stream candidate video ranked higher than the $(k_1+1)$-th internal stream candidate video can be played. By sliding to update the preview information of the internal stream candidate video, the user can watch one or more internal stream candidate videos.

Figure 7:
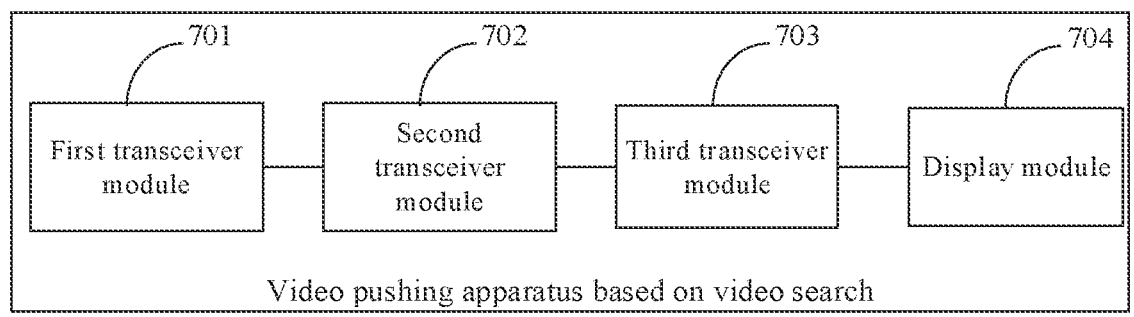
FIG. 7 is a schematic structural diagram of a video pushing apparatus in the present disclosure.

FIG. 7 is a schematic structural diagram of a video pushing apparatus provided in an embodiment of the present disclosure. As illustrated in FIG. 7, the apparatus of the embodiment of the present disclosure may include a first transceiver module 701, a second transceiver module 702, a third transceiver module 703, and a fourth transceiver module 704. The first transceiver module 702 is configured to transmit a received search keyword to a server. The second transceiver module 702 is configured to receive first video preview information, fed back by the server, of at least two first videos matching the search keyword, and display the first video preview information on a first display interface, the at least two first video including at least two types of videos. The third transceiver module 703 is configured to transmit, to the server, a video-obtaining request carrying identification information of a first target video corresponding to the first target preview information, in response to receiving a play-triggering operation on first target preview information in the first video preview information. The display module 704 is configured to receive at least two second videos and corresponding second video preview information that are fed back by the server based on the video-obtaining request, and display a first predetermined number of pieces of preview information in the second video preview information on a second display interface.

In some embodiments, the second transceiver module 702 is specifically configured to, in response to receiving the first video preview information, fed back by the server, of the at least two first videos matching the search keyword: receive first video preview information, fed back by the server, of at least two first videos ranked based on video popularity and matching the search keyword. The at least two second videos include a video of a same video type as the first target video and having a video similarity with the first target video satisfying a first predetermined condition. The at least two second videos further include at least one of top N-ranked first videos based on the video popularity in the at least two first videos, and a video screened from a video database and having a video similarity with the top N-ranked first videos satisfying a second predetermined condition, where N is a positive integer.

In some embodiments, the second display interface includes a first region and a second region; after the third transceiver module 703 transmits, to the server, the video-obtaining request carrying the identification information of the first target video corresponding to the first target preview information, the apparatus further includes: a fourth transceiver module configured to receive the first target video fed back by the server; and a first play module configured to play the first target video in the first region of the second display interface. The display module 704 is specifically configured to, when displaying the first predetermined number of pieces of preview information in the second video preview information on the second display interface: display the first predetermined number of pieces of preview information in the second video preview information in the second region of the second display interface.

In some embodiments, after the display module 704 displays the first predetermined number of pieces of preview information in the second video preview information in the second region of the second display interface, the apparatus further includes a fifth transceiver module and a second playing module. The fifth transceiver module is configured to: in response to receiving a sliding operation of a user on the second display interface, determine a second target video from the at least two second videos, and determine a second predetermined number of pieces of preview information from the second video preview information. The second playing module is configured to play the second target video in the first region of the second display interface, and display the second predetermined number of pieces of preview information in the second region of the second display interface.

In some embodiments, the display module 704 is specifically configured to, when receiving at least two second videos and the corresponding second video preview information that are fed back by the server: receive at least two second videos and corresponding second video preview information that are ranked based on user preference and fed back by the server. In addition, the display module 704 is specifically configured to, when displaying the first predetermined number of pieces of preview information in the second video preview information on the second display interface: display the first predetermined number of pieces of preview information, corresponding to the first predetermined number of top-ranked videos in the at least two second videos, in the second video preview information on the second display interface.

Figure 8:
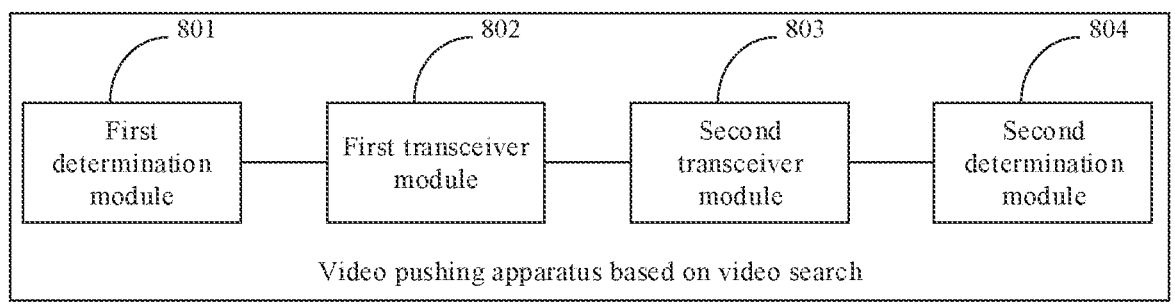
FIG. 8 is another schematic structural diagram of a video pushing apparatus in the present disclosure.

FIG. 8 is a schematic structural diagram of a video pushing apparatus provided in another embodiment of the present disclosure. As illustrated in FIG. 8, the apparatus of the embodiment of the present disclosure may include a first determination module 801, a first transceiver module 802, a second transceiver module 803 and a second determination module 804. The first determination module 801 is configured to determine, based on a search keyword received from a terminal device, at least two first videos matching a search keyword, the at least two first videos including at least two types of videos. The first transceiver module 802 is configured to transmit first video preview information of the at least two first videos to the terminal device. The second transceiver module 803 is configured to receive a video-obtaining request transmitted by the terminal device. The video-obtaining request is generated in response to a play-triggering operation of the first target preview information in the first video preview information, and the video-obtaining request carries identification information of a first target video corresponding to the first target preview information. The second determination module 804 is configured to determine at least two second videos based on the video-obtaining request, and transmit the at least two second videos and corresponding second video preview information to the terminal device.

In some embodiments, after the first determination module 801 determines the at least two first videos matching the search keyword, the apparatus further includes a first ranking module configured to rank the at least two first videos based on video popularity. The first transceiver module 802 is specifically configured to, when transmitting the first video preview information of at least two first videos to the terminal device: transmit first video preview information of at least two ranked first videos to the terminal device.

In some embodiments, when determining the at least two second videos based on the video-obtaining request, the second determining module 804 is specifically configured to perform any one of the following operations: determining, based on the identification information in the video-obtaining request, candidate videos having a video similarity with the first target video satisfying a first predetermined condition, and determining, from the candidate videos, videos of a same video type with the first target video as the at least two second videos; determining, as the at least two second videos, top N-ranked first videos based on the video popularity and videos, determined from the candidate videos, of a same video type with the first target video; and determining, as the at least two second videos, videos, determined from the candidate videos, of a same video type with the first target video, and a video screened from a video database and having a video similarity with the top N-ranked first videos satisfying a second predetermined condition, where N is a positive integer.

In some embodiments, when determining, based on the identification information in the video-obtaining request, the candidate videos having the video similarity with the first target video satisfying the first predetermined condition, the second determination module 804 is specifically configured to: determine the first target video based on the identification information in the video-obtaining request; based on coordinates, in a similarity algorithm model, of the first target video and each video in a prestored database, calculate a video similarity between the first target video and each video; and determine, from the video database, the candidate videos having the video similarity with the first target video satisfying the first predetermined condition, based on the video similarity between the first target video and each video.

In some embodiments, when determining, as the at least two second videos, the video screened from the video database and having the video similarity with the top N-ranked first videos satisfying the second predetermined condition, the second determination module 804 is specifically configured to: determine, based on coordinates of the top N-ranked first videos in the similarity algorithm model, specific parameter coordinates corresponding to the top N-ranked first videos, where the specific parameter coordinates include average coordinates of the top N-ranked first videos or variance coordinates of the top N-ranked first videos; determine coordinates of each video in the prestored database in the similarity algorithm model, and calculate a similarity between the coordinates of each video and the specific parameter coordinates; and determine, based on the similarity, the two second video screened from the video database and corresponding to the coordinates with the calculated similarity satisfying the second predetermined condition.

In some embodiments, after the second determination module 804 determines the at least two second videos based on the video-obtaining request, the apparatus further includes a second ranking module and a third transceiver module. The second ranking module is configured to rank the at least two second videos based on user preference. The user preference is determined by at least one of user's attribute information and user's historical viewing record. The third transceiver module configured to transmit, to the terminal device, the at least two second videos ranked based on the user preference and corresponding second video preview information.

Figure 9:
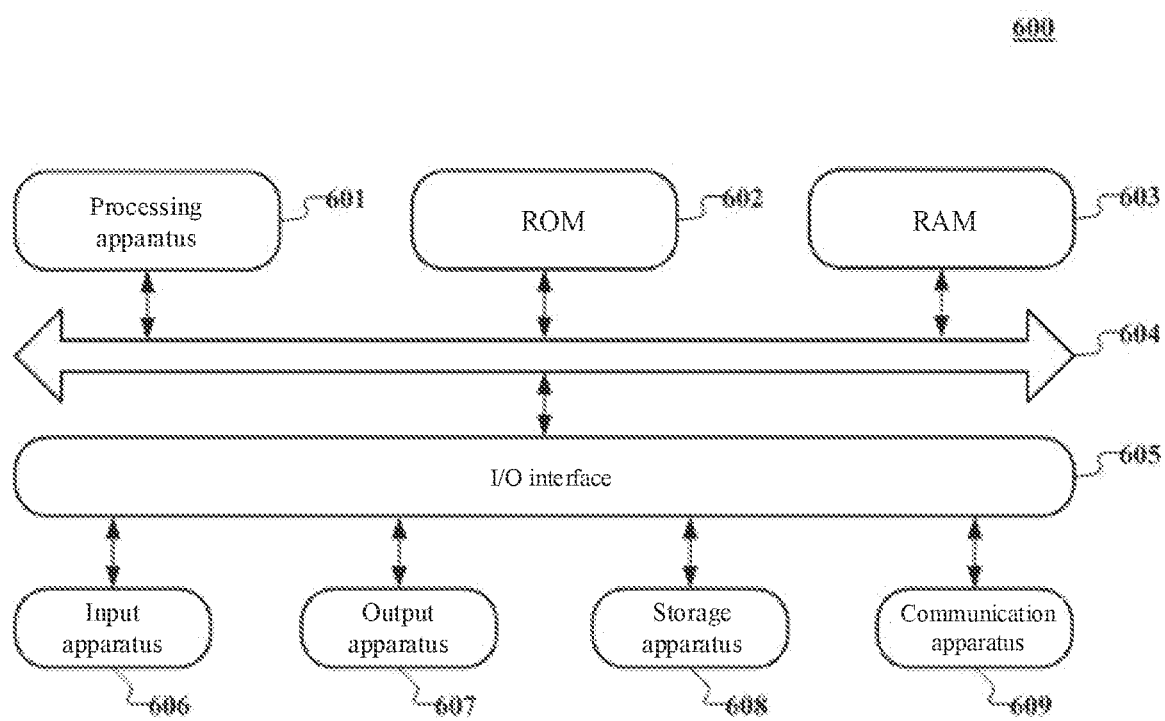
FIG. 9 is a schematic structural diagram of an electronic device in the present disclosure.

FIG. 9 illustrates a schematic structural diagram of an electronic device (for example, the terminal device in FIG. 1 or the server in FIG. 4) 600 according to the embodiments of the present disclosure, which is adapted to implement the embodiments of the present disclosure. The terminal device in the embodiments of the present disclosure may include, but is not limited to, a mobile terminal device, such as a mobile phone, a notebook computer, a digital broadcast receiver, a personal digital assistant (PDA), a tablet (PAD), a portable multimedia player (PMP), a vehicle-mounted terminal (e.g., a vehicle-mounted navigation terminal) and a fixed terminal such as a digital TV, a desktop computer, etc. The electronic device illustrated in FIG. 9 is only an example, and should not bring any limitation to the function and scope of use of the embodiments of the present disclosure.

The electronic device includes a memory and a processor. The processor here may be referred to as a processing apparatus 601 below, and the memory may include at least one of a read-only memory (ROM) 602, a random access memory (RAM) 603, and a storage apparatus 608, as described below.

As illustrated in FIG. 9, the electronic device 600 may include a processing apparatus (such as a central processing unit, a graphics processor, etc.) 601, which can execute various appropriate actions and processing based on a program stored in the read-only memory (ROM) 602 or based on a program loaded into the random access memory (RAM) 603 from the storage apparatus 608. Various programs and data required for operations of the electronic device 600 are stored in the RAM 603. The processing apparatus 601, the ROM 602, and the RAM 603 are connected to each other through a bus 604. An input/output (I/O) interface 605 is connected to the bus 604.

Generally, the following apparatuses can be connected to the I/O interface 605: an input apparatus 606, for example, a touch screen, a touch pad, a keyboard, a mouse, a camera, a microphone, an accelerometer, a gyroscope, etc.; an output apparatus 607, for example, a liquid crystal display (LCD), a speaker, a vibration, etc.; a storage apparatus 608, such as a magnetic tape, a hard disk, etc.; and a communication apparatus 609. The communication apparatus 609 may allow the electronic device 600 to perform wireless or wired communication with other devices to exchange data. Although FIG. 9 illustrates an electronic device 600 including various apparatuses, it should be understood that the electronic device 600 does not require to be implemented or provided with all the illustrated apparatuses. The electronic device 600 may alternatively be implemented or provided with more or fewer apparatuses.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program codes for executing the method illustrated in any one of the flowcharts. In such an embodiment, the computer program may be downloaded and installed from the network through the communication apparatus 609, or the computer program may be installed from the storage apparatus 608, or the computer program may be installed from the ROM 602. When the computer program is executed by the processing apparatus 601, the above-mentioned functions defined in the method according to any one of the embodiments of the present disclosure are executed.

It should be noted that the above-mentioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage media may include, but are not limited to: electrical connection with one or more wires, a portable computer disk, a hard disk, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include data signals propagated in a baseband or as a part of a carrier wave, and computer-readable program codes are carried therein. The propagated data signals can take many forms, including but not limited to, electromagnetic signals, optical signals, or any suitable combination of the foregoing. The computer-readable signal medium may be any computer-readable medium other than the computer-readable storage medium. The computer-readable signal medium may send, propagate or transmit a program for use by or in combination with the instruction execution system, apparatus, or device. The program codes contained on the computer-readable medium can be transmitted by any suitable medium, including but not limited to: a wire, an optical cable, a radio frequency (RF), etc., or any suitable combination of the above.

In some embodiments, the client and server can communicate with any currently known or future developed network protocol such as Hyper Text Transfer Protocol (HTTP), and can interconnect with digital data communication (e.g., communication network) in any form or medium. Examples of communication networks include local area networks ("LAN"), wide area networks ("WAN"), the Internet, and end-to-end networks (for example, ad hoc end-to-end networks), as well as any currently known or future developed networks.

The above-mentioned computer-readable medium may be included in the above-mentioned electronic device; or it may exist alone without being assembled into the electronic device.

The above-mentioned computer-readable medium carries one or more programs. When the above-mentioned one or more programs are executed by the electronic device, the electronic device: transmit a received search keyword to a server; receive first video preview information, fed back by the server, of at least two first videos matching the search keyword, and display the at least two first video preview information on a first display interface, the at least two first video including at least two types of videos; transmit, to the server, a video-obtaining request carrying identification information of a first target video corresponding to the first target preview information, in response to receiving a play-triggering operation on first target preview information in the first video preview information; and receive at least two second videos and corresponding second video preview information that fed back by the server based on the video-obtaining request, and display a first predetermined number of pieces of preview information in the second video preview information on the second display interface.

Alternatively, the computer readable medium carries one or more programs, and when the one or more programs are executed by the electronic device, the electronic device: determine, based on a search keyword received from a terminal device, at least two first videos matching the search keyword, the at least two first videos including at least two types of video; transmit first video preview information of the at least two first videos to the terminal device; receive a video-obtaining request transmitted by the terminal device, where the video-obtaining request is generated in response to a play-triggering operation for the first target preview information in the first video preview information, and the video-obtaining request carries identification information of a first target video corresponding to the first preview information; and determine at least two second videos based on the video-obtaining request, and transmit the at least two second videos and corresponding second video preview information to the terminal device.

The computer program codes used to perform the operations of the present disclosure can be written in one or more programming languages or a combination thereof. The above-mentioned programming languages include, but are not limited to, object-oriented programming languages—such as Java, Smalltalk, C++, and conventional procedural programming languages-such as "C" language or similar programming languages. The program codes can be executed entirely on a user's computer, partly on the user's computer, as an independent software package, partly on the user's computer and partly on a remote computer, or entirely on the remote computer or server. In a case of the remote computer, the remote computer can be connected to the user's computer through any kind of network, including a local area network (LAN) or a wide area network (WAN), or can be connected to an external computer (for example, through Internet connection using an Internet service provider).

The flowcharts and block diagrams in the accompanying drawings illustrate the possible implementation architectures, functions, and operations of the system, method, and computer program product according to various embodiments of the present disclosure. In this regard, each block in the flowcharts or block diagrams can represent a module, a program segment, or some of codes, and the module, the program segment, or some of codes contain one or more executable instructions for realizing a specified logic function. It should be noted that, in some alternative implementations, the functions marked in the blocks may occur in a different order from the order marked in the drawings. For example, two blocks shown one after the other can actually be executed substantially in parallel, or they can sometimes be executed in a reverse order, depending on the functions involved. It should be noted that each block in the block diagrams and/or flowcharts, and a combination of blocks in the block diagrams and/or flowcharts, can be implemented by a dedicated hardware-based system that performs the specified functions or operations, or can be implemented by a combination of dedicated hardware and computer instructions.

The modules or units involved in the described embodiments of the present disclosure can be implemented in software or hardware. A name of the modules or unit does not constitute a limitation on the unit itself under certain circumstance. For example, the first transceiver module can be described as "a module that transmits a received search keyword to a server".

The functions described herein above may be performed at least in part by one or more hardware logic components. For example, without limitation, exemplary types of hardware logic components that can be used include: a field programmable gate array (FPGA), an application specific integrated circuit (ASIC), an application specific standard product (ASSP), a system on chip (SOC), a complex programmable logical device (CPLD) and so on.

In the context of the present disclosure, a machine-readable medium may be a tangible medium, which may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include electrical connections based on one or more wires, a portable computer disk, a hard disk, a random access memory (RAM), a read-only memory (ROM), an erasable programmable read-only memory (EPROM or flash memory), an optical fiber, a portable compact disk read only memory (CD-ROM), an optical storage device, a magnetic storage device, or any suitable combination of the foregoing.

According to one or more embodiments of the present disclosure, a video pushing method based on video search is provided. The video pushing method includes: transmitting a received search keyword to a server; receiving first video preview information, fed back by the server, of at least two first videos matching the search keyword, and displaying the first video preview information on a first display interface, the at least two first videos including at least two types of videos; in response to receiving a play-triggering operation on first target preview information in the first video preview information, transmitting, to the server, a video-obtaining request carrying identification information of a first target video corresponding to the first target preview information; and receiving at least two second videos and corresponding second video preview information that are fed back by the server based on the video-obtaining request, and displaying a first predetermined number of pieces of preview information in the second video preview information on a second display interface.

In some embodiments, receiving the first video preview information, said receiving the first video preview information, fed back by the server, of the at least two first videos matching the search keyword includes: receiving first video preview information, fed back by the server, of at least two first videos ranked based on video popularity and matching the search keyword; the at least two second videos include a video of a same video type as the first target video and having a video similarity with the first target video satisfying a first predetermined condition. The at least two second videos further include at least one of: top N-ranked first videos based on the video popularity in the at least two first videos; and a video screened from a video database and having a video similarity with the top N-ranked first videos satisfying a second predetermined condition, where N is a positive integer.

In some embodiments, the second display interface includes a first region and a second region; and the video pushing method further includes, subsequent to said transmitting, to the server, the video-obtaining request carrying the identification information of the first target video corresponding to the first target preview information: receiving the first target video fed back by the server; and playing the first target video in the first region of the second display interface, wherein said displaying the first predetermined number of pieces of preview information in the second video preview information on the second display interface includes: displaying the first predetermined number of pieces of preview information in the second video preview information in the second region of the second display interface.

In some embodiments, subsequent to said displaying the first predetermined number of pieces of preview information in the second video preview information in the second region of the second display interface, the video pushing method further includes: in response to receiving a sliding operation of a user on the second display interface, determining a second target video from the at least two second videos, and determining a second predetermined number of pieces of preview information from the second video preview information; and playing the second target video in the first region of the second display interface, and displaying the second predetermined number of pieces of preview information in the second region of the second display interface.

In some embodiments, said receiving the at least two second videos and the corresponding second video preview information that are fed back by the server includes: receiving at least two second videos and corresponding second video preview information that are ranked based on user preference and fed back by the server; said displaying the first predetermined number of pieces of preview information in the second video preview information on the second display interface includes: displaying the first predetermined number of pieces of preview information, corresponding to the first predetermined number of top-ranked videos in the at least two second videos, in the second video preview information on the second display interface.

According to one or more embodiments of the present disclosure, a video pushing method based on video search is provided. The video pushing method includes: determining, based on a search keyword received from a terminal device, at least two first videos matching the search keyword, the at least two first videos including at least two types of videos; transmitting first video preview information of the at least two first videos to the terminal device; receiving a video-obtaining request transmitted by the terminal device, where the video-obtaining request is generated in response to a play-triggering operation of the first target preview information in the first video preview information, and the video-obtaining request carries identification information of a first target video corresponding to the first target preview information; and determining at least two second videos based on the video-obtaining request, and transmitting the at least two second videos and corresponding second video preview information to the terminal device.

In some embodiments, subsequent to said determining the at least two first videos matching the search keyword, the video pushing method further includes: ranking the at least two first videos based on video popularity; and said transmitting the first video preview information of the at least two first videos to the terminal device includes: transmitting first video preview information of at least two ranked first videos to the terminal device.

In some embodiments, said determining the at least two second videos based on the video-obtaining request includes any one of: determining, based on the identification information in the video-obtaining request, candidate videos having a video similarity with the first target video satisfying a first predetermined condition, and determining, from the candidate videos, videos of a same video type with the first target video as the at least two second videos; determining, as the at least two second videos, top N-ranked first videos based on the video popularity and videos, determined from the candidate videos, of a same video type with the first target video; or determining, as the at least two second videos, videos, determined from the candidate videos, of a same video type with the first target video, and a video screened from a video database and having a video similarity with the top N-ranked first videos satisfying a second predetermined condition, where N is a positive integer.

In some embodiments, said determining, based on the identification information in the video-obtaining request, the candidate videos having the video similarity with the first target video satisfying the first predetermined condition includes: determining the first target video based on the identification information in the video-obtaining request; based on coordinates, in a similarity algorithm model, of the first target video and each video in a prestored database, calculating a video similarity between the first target video and each video; and determining, from the video database, the candidate videos having the video similarity with the first target video satisfying the first predetermined condition, based on the video similarity between the first target video and each video.

In some embodiments, said determining, as the at least two second videos, the video screened from the video database and having the video similarity with the top N-ranked first videos satisfying the second predetermined condition includes: determining, based on coordinates of the top N-ranked first videos in the similarity algorithm model, specific parameter coordinates corresponding to the top N-ranked first videos, wherein the specific parameter coordinates include average coordinates of the top N-ranked first videos or variance coordinates of the top N-ranked first videos; determining coordinates of each video in the prestored database in the similarity algorithm model, and calculating a similarity between the coordinates of each video and the specific parameter coordinates; and determining, based on the similarity, the two second video screened from the video database and corresponding to the coordinates with the calculated similarity satisfying the second predetermined condition.

In some embodiments, subsequent to said determining the at least two second videos based on the video-obtaining request, the video pushing method further includes: ranking the at least two second videos based on user preference, wherein the user preference is determined by at least one of user's attribute information and user's historical viewing record; and transmitting, to the terminal device, the at least two second videos ranked based on the user preference and corresponding second video preview information.

According to one or more embodiments of the present disclosure, a video pushing apparatus is provided. The video pushing apparatus includes: a first transceiver module configured to transmit a received search keyword to a server; a second transceiver module configured to receive first video preview information, fed back by the server, of at least two first videos matching the search keyword, and display the first video preview information on a first display interface, the at least two first videos including at least two types of videos; a third transceiver module configured to transmit, to the server, a video-obtaining request carrying identification information of a first target video corresponding to the first target preview information, in response to receiving a play-triggering operation on first target preview information in the first video preview information; and a display module configured to receive at least two second videos and corresponding second video preview information that are fed back by the server based on the video-obtaining request, and display a first predetermined number of pieces of preview information in the second video preview information on a second display interface.

In some embodiments, the second transceiver module is specifically configured to, in response to receiving the first video preview information, fed back by the server, of the at least two first videos matching the search keyword: receive first video preview information, fed back by the server, of at least two first videos ranked based on video popularity and matching the search keyword. The at least two second videos include a video of a same video type as the first target video and having a video similarity with the first target video satisfying a first predetermined condition. The at least two second videos further include at least one of top N-ranked first videos based on the video popularity in the at least two first videos, and a video screened from a video database and having a video similarity with the top N-ranked first videos satisfying a second predetermined condition, where N is a positive integer.

In some embodiments, the second display interface includes a first region and a second region; after the third transceiver module transmits, to the server, the video-obtaining request carrying the identification information of the first target video corresponding to the first target preview information, the apparatus further includes: a fourth transceiver module configured to receive the first target video fed back by the server; and a first play module configured to play the first target video in the first region of the second display interface. The display module is specifically configured to, when displaying the first predetermined number of pieces of preview information in the second video preview information on the second display interface: display the first predetermined number of pieces of preview information in the second video preview information in the second region of the second display interface.

In some embodiments, after the display module displays the first predetermined number of pieces of preview information in the second video preview information in the second region of the second display interface, the apparatus further includes a fifth transceiver module and a second playing module. The fifth transceiver module is configured to: in response to receiving a sliding operation of a user on the second display interface, determine a second target video from the at least two second videos, and determine a second predetermined number of pieces of preview information from the second video preview information. The second playing module is configured to play the second target video in the first region of the second display interface, and display the second predetermined number of pieces of preview information in the second region of the second display interface.

In some embodiments, the display module is specifically configured to, when receiving at least two second videos and the corresponding second video preview information that are fed back by the server: receive at least two second videos and corresponding second video preview information that are ranked based on user preference and fed back by the server. In addition, the display module is specifically configured to, when displaying the first predetermined number of pieces of preview information in the second video preview information on the second display interface: display the first predetermined number of pieces of preview information, corresponding to the first predetermined number of top-ranked videos in the at least two second videos, in the second video preview information on the second display interface.

According to one or more embodiments of the present disclosure, a video pushing apparatus is provided. The video pushing apparatus includes a first determination module configured to determine, based on a search keyword received from a terminal device, at least two first videos matching a search keyword, the at least two first videos including at least two types of videos; a first transceiver module configured to transmit first video preview information of the at least two first videos to the terminal device; a second transceiver module configured to receive a video-obtaining request transmitted by the terminal device, where the video-obtaining request is generated in response to a play-triggering operation of the first target preview information in the first video preview information, and the video-obtaining request carries identification information of a first target video corresponding to the first target preview information; and a second determination module configured to determine at least two second videos based on the video-obtaining request, and transmit the at least two second videos and corresponding second video preview information to the terminal device.

In some embodiments, after the first determination module determines the at least two first videos matching the search keyword, the apparatus further includes a first ranking module configured to rank the at least two first videos based on video popularity. The first transceiver module is specifically configured to, when transmitting the first video preview information of at least two first videos to the terminal device: transmit first video preview information of at least two ranked first videos to the terminal device.

In some embodiments, when determining the at least two second videos based on the video-obtaining request, the second determining module is specifically configured to perform any one of the following operations: determining, based on the identification information in the video-obtaining request, candidate videos having a video similarity with the first target video satisfying a first predetermined condition, and determining, from the candidate videos, videos of a same video type with the first target video as the at least two second videos; determining, as the at least two second videos, top N-ranked first videos based on the video popularity and videos, determined from the candidate videos, of a same video type with the first target video; and determining, as the at least two second videos, videos, determined from the candidate videos, of a same video type with the first target video, and a video screened from a video database and having a video similarity with the top N-ranked first videos satisfying a second predetermined condition, where N is a positive integer.

In some embodiments, when determining, based on the identification information in the video-obtaining request, the candidate videos having the video similarity with the first target video satisfying the first predetermined condition, the second determination module is specifically configured to: determine the first target video based on the identification information in the video-obtaining request; based on coordinates, in a similarity algorithm model, of the first target video and each video in a prestored database, calculate a video similarity between the first target video and each video; and determine, from the video database, the candidate videos having the video similarity with the first target video satisfying the first predetermined condition, based on the video similarity between the first target video and each video.

In some embodiments, when determining, as the at least two second videos, the video screened from the video database and having the video similarity with the top N-ranked first videos satisfying the second predetermined condition, the second determination module is specifically configured to: determine, based on coordinates of the top N-ranked first videos in the similarity algorithm model, specific parameter coordinates corresponding to the top N-ranked first videos, where the specific parameter coordinates include average coordinates of the top N-ranked first videos or variance coordinates of the top N-ranked first videos; determine coordinates of each video in the prestored database in the similarity algorithm model, and calculate a similarity between the coordinates of each video and the specific parameter coordinates; and determine, based on the similarity, the two second video screened from the video database and corresponding to the coordinates with the calculated similarity satisfying the second predetermined condition.

In some embodiments, after the second determination module determines the at least two second videos based on the video-obtaining request, the apparatus further includes a second ranking module and a third transceiver module. The second ranking module is configured to rank the at least two second videos based on user preference. The user preference is determined by at least one of user's attribute information and user's historical viewing record. The third transceiver module configured to transmit, to the terminal device, the at least two second videos ranked based on the user preference and corresponding second video preview information.

The above description is only an explanation of preferred embodiments and the applied technical principles of the present disclosure. Those skilled in the art should understand that the scope of disclosure involved in the present disclosure is not limited to the technical solutions formed by the specific combination of the above technical features, and shall cover other technical solutions formed by arbitrarily combining the above technical features or the equivalent features without departing from the above disclosed concept, for example, the technical solutions formed by changing the above-mentioned features with the technical features disclosed in the present disclosure (but not limited to) having similar functions.

In addition, although the operations are described in a specific order, it should not be understood that these operations are required to be performed in the specific order as illustrated or to be performed sequentially. Under a certain circumstance, multitasking and parallel processing may be advantageous. Likewise, although several specific implementation details are included in the above discussion, these should not be construed as limiting the scope of the present disclosure. Certain features that are described in the context of separate embodiments can be implemented in combination in a single embodiment. Conversely, various features described in the context of a single embodiment can be implemented in a plurality of embodiments individually or in any suitable sub-combination.

Although the subject matters are described in language specific to structural features and/or logical actions of the method, it should be understood that the subject matters defined in the appended claims are not necessarily limited to the specific features or actions described above. On the contrary, the specific features and actions described above are merely exemplary forms of implementing the claims.

What is claimed is:

1. A video pushing method based on video search, comprising:
    determining, based on a search keyword received from a terminal device, at least two first videos matching the search keyword, the at least two first videos comprising at least two types of videos;
    transmitting first video preview information of the at least two first videos to the terminal device;
    receiving a video-obtaining request transmitted by the terminal device, wherein the video-obtaining request is generated in response to a play-triggering operation of the first target preview information in the first video preview information, and the video-obtaining request carries identification information of a first target video corresponding to the first target preview information; and
    determining at least two second videos based on the video-obtaining request, and transmitting the at least two second videos and corresponding second video preview information to the terminal device,
    wherein the method further comprises, subsequent to said determining the at least two first videos matching the search keyword: ranking the at least two first videos based on video popularity, wherein said transmitting the first video preview information of the at least two first videos to the terminal device comprises: transmitting first video preview information of at least two ranked first videos to the terminal device,
    wherein said determining the at least two second videos based on the video-obtaining request comprises any one of:
        determining, based on the identification information in the video-obtaining request, candidate videos having a video similarity with the first target video satisfying a first predetermined condition, and determining, from the candidate videos, videos of a same video type with the first target video as the at least two second videos, wherein said determining, based on the identification information in the video-obtaining request, the candidate videos having the video similarity with the first target video satisfying the first predetermined condition comprises:
            determining the first target video based on the identification information in the video-obtaining request;
            based on coordinates, in a similarity algorithm model, of the first target video and each video in a prestored database, calculating a video similarity between the first target video and each video; and
            determining, from the video database, the candidate videos having the video similarity with the first target video satisfying the first predetermined condition, based on the video similarity between the first target video and each video; or
        determining, as the at least two second videos, videos, determined from the candidate videos, of a same video type with the first target video, and a video screened from a video database and having a video similarity with the top N-ranked first videos satisfying a second predetermined condition, where N is a positive integer, wherein said determining, as the at least two second videos, the video screened from the video database and having the video similarity with the top N-ranked first videos satisfying the second predetermined condition comprises:
            determining, based on coordinates of the top N-ranked first videos in the similarity algorithm model, specific parameter coordinates corresponding to the top N-ranked first videos, wherein the specific parameter coordinates comprise average coordinates of the top N-ranked first videos or variance coordinates of the top N-ranked first videos;
            determining coordinates of each video in the prestored database in the similarity algorithm model, and calculating a similarity between the coordinates of each video and the specific parameter coordinates; and determining, based on the similarity, the two second video screened from the video database and corresponding to the coordinates with the calculated similarity satisfying the second predetermined condition.

2. The video pushing method based on video search according to claim 1, further comprising, subsequent to said determining the at least two second videos based on the video-obtaining request:
   ranking the at least two second videos based on user preference, wherein the user preference is determined by at least one of user's attribute information and user's historical viewing record; and
   transmitting, to the terminal device, the at least two second videos ranked based on the user preference and corresponding second video preview information.

3. An electronic device, comprising:
   a memory having a computer program stored thereon; and
   a processor configured to implement the method according to claim 1 when executing the computer program.

4. A non-transitory computer-readable medium, having a computer program stored thereon, wherein the computer program, when executed by a processor, implements the method according to claim 1.

* * * * *